United States Patent
Yamashita (10) Patent No.: US 7,019,991 B2
(45) Date of Patent: Mar. 28, 2006

(54) RECTIFYING CIRCUIT

(75) Inventor: Tsuyoshi Yamashita, Anjo (JP)

(73) Assignee: Denso Corporation, Kariya (JP)

( * ) Notice: Subject to any disclaimer, the term of this patent is extended or adjusted under 35 U.S.C. 154(b) by 175 days.

(21) Appl. No.: 10/797,180

(22) Filed: Mar. 11, 2004

(65) Prior Publication Data

US 2004/0179380 A1    Sep. 16, 2004

(30) Foreign Application Priority Data

Mar. 11, 2003  (JP) ............................. 2003-065002
May 20, 2003   (JP) ............................. 2003-142439

(51) Int. Cl.
*H02H 7/125* (2006.01)
(52) U.S. Cl. ....................................... 363/52
(58) Field of Classification Search .................. 363/17, 363/24, 25, 52, 54, 81, 84, 125, 126, 133
See application file for complete search history.

(56) References Cited

U.S. PATENT DOCUMENTS 4,688,157 A * 8/1987 Rischmueller ............... 363/20
5,689,409 A * 11/1997 Scharlach et al. .......... 363/56.11
6,532,160 B1 * 3/2003 Hirokawa et al. ............. 363/52

FOREIGN PATENT DOCUMENTS

| JP | A 6-233535 | 8/1994 |
| JP | A 9-285126 | 10/1997 |
| JP | A 10-4680 | 1/1998 |
| JP | A 11-55945 | 2/1999 |
| JP | B2 2963601 | 8/1999 |
| JP | B2 3152016 | 1/2001 |

* cited by examiner

*Primary Examiner*—Adolf Berhane
(74) *Attorney, Agent, or Firm*—Oliff & Berridge, PLC (57) ABSTRACT

In a rectifying circuit, a rectifying diode is configured to rectify a first AC voltage to output a first DC voltage. A protection diode circuit has constant reverse voltage diodes and electrically connected to the rectifying diode in parallel thereto. The constant reverse voltage diodes are electrically connected to each other in series. Each of the constant reverse voltage diodes has a breakdown voltage and a second forward voltage. A sum of the breakdown voltages of the constant reverse voltage diodes is lower than the breakdown voltage of the rectifying diode, and a sum of said second forward voltages is higher than the first forward voltage of the rectifying diode.

24 Claims, 5 Drawing Sheets

RECTIFYING CIRCUIT

BACKGROUND OF THE INVENTION

The present invention relates to a rectifying circuit, and more particularly, to a rectifying circuit used in a DC(direct current)-DC converter for delivering power between two batteries which have different rated DC voltages, respectively.

Rectifying circuits each having a rectifying diode are applied for DC—DC converters. In cases where the rectifying diode turns off, the sum of reverse bias voltage inputted to the rectifying diode and the reverse recovery voltage are applied on the rectifying diode. This requires that the rectifying diode is designed such that its breakdown volt exceeds the sum of the inputted reverse bias voltage and the reverse recovery voltage.

One of methods of increasing the breakdown voltage of the rectifying diode is to make large the breakdown layer width having the low impurity concentration. This method, however, may cause the forward loss of the rectifying diode and the radiated noise for the reverse recovery time thereof, whereby to reduce the breakdown voltage of the rectifying diode as much as possible while keeping it within the allowed limits.

One of methods of making low the reacting diode's rated voltage is to connect a snubber circuit, which has a capacitor and a resistor connected to each other in series, to the rectifying diode in parallel thereto, which, as for example, has already been disclosed in Japanese Patent Publication No. H10-4680.

Adding the snubber circuit to the rectifying circuit causes its whole structure to be large-sized and its cost to increase.

SUMMARY OF THE INVENTION

The present invention is made on the background.

According, it is an object of the present invention to provide a rectifying circuit, which is capable of balancing the decrease of the breakdown voltage of its rectifying diode with keeping the whole structure of the rectifying circuit simple and compact.

According to one aspect of the present invention, there is provided a rectifying circuit comprising: a rectifying diode having a breakdown voltage and a first forward voltage, and configured to rectify a first AC voltage to output a first DC voltage; and a protection diode circuit having a plurality of constant reverse voltage diodes and electrically connected to the rectifying diode in parallel thereto, the plurality of constant reverse voltage diodes being electrically connected to each other in series, each of the plurality of constant reverse voltage diodes having a breakdown voltage and a second forward voltage, wherein a sum of the breakdown voltages of the plurality of constant reverse voltage diodes is lower than the breakdown voltage of the rectifying diode, and a sum of the second forward voltages of the constant reverse voltage diodes is higher than the first forward voltage of the rectifying diode.

According to another aspect of the present invention, there is provided a rectifying circuit comprising: a rectifying diode having a breakdown voltage and a first forward voltage, the rectifying diode being configured to rectify an AC voltage; and a protection diode circuit having a protection diode and a constant reverse voltage diode and electrically connected in parallel to the rectifying diode, the protection diode having a breakdown voltage and a second forward voltage and being reversely connected to the rectifying diode, the constant reverse voltage diode having a breakdown voltage and a third forward voltage and electrically connected reversely to the protection diode in series, wherein a sum of the second forward voltage of the protection diode and the breakdown voltage of the constant reverse voltage diode is lower than the breakdown voltage of the rectifying diode, and a sum of the breakdown voltage of the protection diode and the third forward voltage of the constant reverse voltage diode is higher than the first forward voltage of the rectifying diode.

According to further aspect of the present invention, there is provided a rectifying circuit comprising: a synchronous rectifying MOS transistor having a breakdown voltage and an intrinsic diode with a first forward voltage, the synchronous rectifying MOS transistor being configured to synchronously rectify an AC voltage; and a protection diode circuit having a plurality of constant reverse voltage diodes and electrically connected to the synchronous rectifying MOS transistor in parallel thereto, the plurality of constant reverse voltage diodes being electrically connected to each other in series, each of the plurality of constant reverse voltage diodes having a breakdown voltage and a second forward voltage, wherein a sum of the breakdown voltages of the plurality of constant reverse voltage diodes is lower than the breakdown voltage of the synchronous rectifying MOS transistor, and a sum of the second forward voltages is higher than the first forward voltage of the intrinsic diode of the synchronous rectifying MOS transistor.

According to still further aspect of the present invention, there is provided a rectifying circuit comprising: a synchronous rectifying MOS transistor having a breakdown voltage and an intrinsic diode with a first forward voltage, the synchronous rectifying MOS transistor being configured to synchronously rectify an AC voltage; and a protection diode circuit having a protection diode and a constant reverse voltage diode and electrically connected in parallel to the synchronous rectifying MOS transistor, the protection diode having a breakdown voltage and a second forward voltage and being reversely connected with respect to the intrinsic diode of the synchronous rectifying MOS transistor, the constant reverse voltage diode having a breakdown voltage and a third forward voltage, and electrically connected reversely to the protection diode in series, wherein a sum of the second forward voltage of the protection diode and the breakdown voltage of the constant reverse voltage diode is lower than the breakdown voltage of the synchronous rectifying MOS transistor, and a sum of the breakdown voltage of the protection diode and the third forward voltage of the constant reverse voltage diode is higher than the first forward voltage of the intrinsic diode.

BRIEF DESCRIPTION OF THE DRAWINGS

Other objects and aspects of the invention will become apparent from the following description of an embodiment with reference to the accompanying drawings in which.

DETAILED DESCRIPTION OF EMBODIMENTS OF THE INVENTION

Embodiments and modifications of the invention will be described hereinafter with reference to the accompanying drawings.

(First Embodiment)

Figure 1:
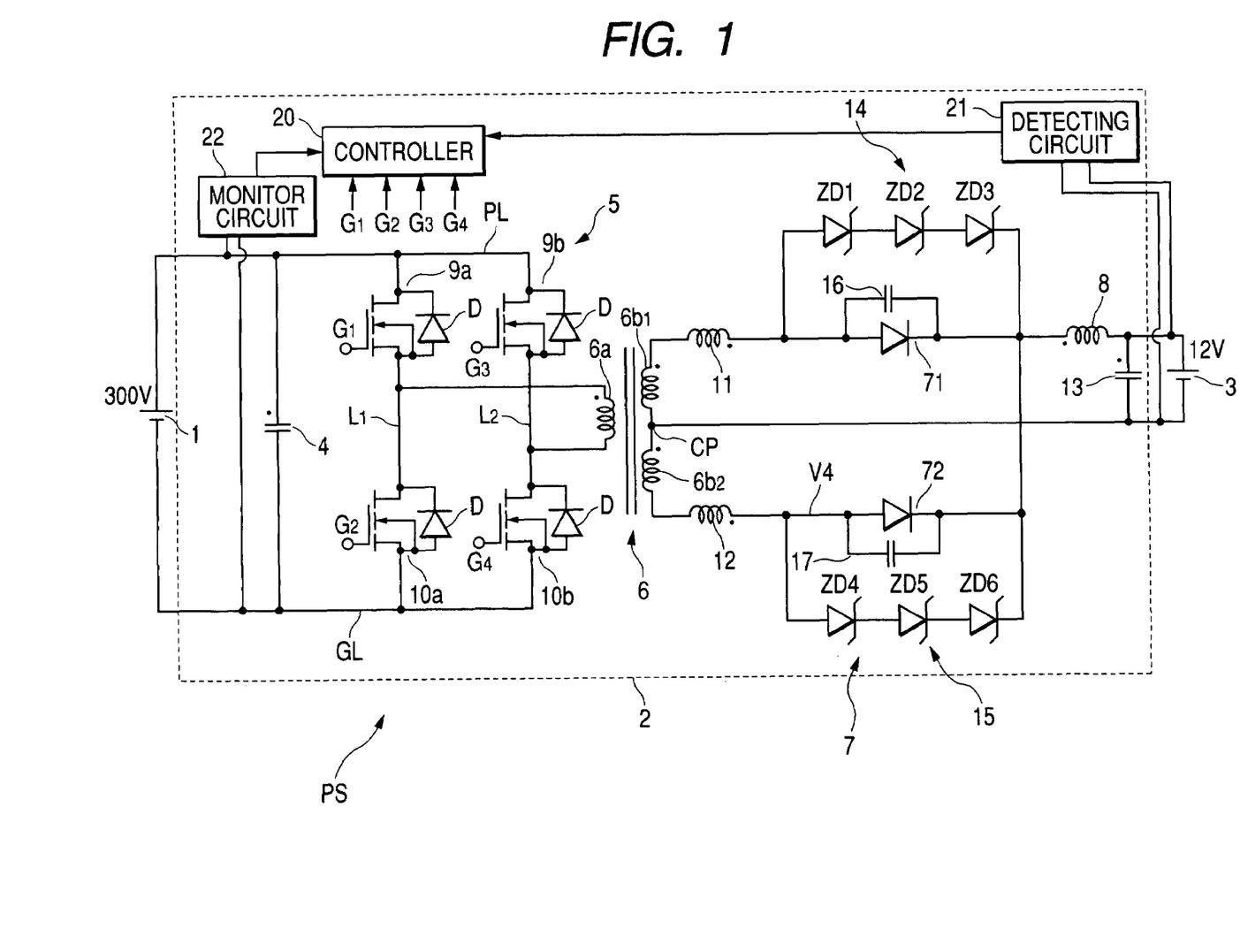
FIG. 1 is a circuit diagram illustrating a circuit structure of a power supply for vehicles, in which a DC—DC converter including a rectifying circuit according to a first embodiment of the present invention.

FIG. 1 is a diagram illustrating a circuit structure of a power supply PS for vehicles, in which a DC—DC converter including a rectifying circuit according to a first embodiment of the present invention.

The power supply PS is provided with a high DC-voltage battery 1, such as 300V battery, a DC—DC converter 2 electrically connected thereto, and a low DC-voltage battery 3, such as 12V battery, which is electrically connected to the DC—DC converter 2.

For example, the high DC-voltage battery 1 is a high DC-voltage battery for traction units installed in the vehicle, and the low DC-voltage battery 3 is a low DC-voltage battery for auxiliary loads installed in the vehicle.

The DC—DC converter 2 includes an input-side smoothing capacitor 4, an inverter circuit 5, a step-down transformer 6, a rectifying circuit 7, a smoothing inductor 8, and an output-side smoothing capacitor 13.

The input-side smoothing capacitor 4 is electrically connected to the high DC-voltage battery 1 in parallel.

The inverter circuit 5 is electrically connected to the positive side line PL and the negative side line GL.

The inverter circuit 5 has a pair of high-side (upper arm) MOS (Metal Oxide Semiconductor) transistors 9a, 9b and a pair of low-side (lower arm) MOS transistors 10a, 10b.

The inverter circuit 5 is an usual full bridge circuit. That is, the drain of each of the upper arm MOS transistors 9a and 9b is electrically connected to the positive side line PL, and the source of each of the upper arm MOS transistors 9a and 9b is electrically connected to the drain of each of the lower arm MOS transistors 10a and 10b. The source of each of the lower arm MOS transistors 10a and 10b is electrically connected to the negative side line GL.

Each of the MOS transistors 9a, 9b, 10a, and 10b includes an intrinsic diode D. The direct current flowing direction of the intrinsic diode D is opposite of the direct current direction through each of the MOS transistors 9a, 9b, 10a, and 10b.

The transformer 6 has a primary winding 6a, and a pair of secondary windings 6b1 and 6b2 connected through a connection point CP in series. The primary winding 6a is electrically connected between a line L1 connecting the source of the upper arm MOS transistor 9a and the drain of the lower MOS transistor 10a, and a line 12 connecting the source of the upper arm MOS transistor 9b and the drain of the lower MOS transistor 10b.

The rectifying circuit 7 is composed of a pair of rectifying diodes 71 and 72 each of which has high current capacity. The secondary winding 6b1 is electrically connected to the anode terminal of the rectifying diode 71, and the secondary diode 6b2 is electrically connected to the anode terminal of the rectifying diode 72. The cathode terminals of the paired rectifying diodes 71 and 72 are electrically connected through the smoothing inductor 8 to the positive terminal of the low DC-voltage battery 3.

The connection point CP between the paired secondary windings 6b1 and 6b2 is electrically connected to the negative terminal of the low DC-voltage battery 3. The output-side smoothing capacitor 13 is electrically connected to the output side of the smoothing inductor 8 and the connection line between the connection point CP and the negative terminal of the low DC-voltage battery 3.

Furthermore, the rectifying circuit 7 according to the first embodiment includes a pair of protection diode circuits 14 and 15. The protection diode circuit 14 is electrically connected to the rectifying diode 71 in parallel thereto, and the protection diode circuit 15 is electrically connected to the rectifying diode 72 in parallel thereto.

The protection diode circuit 14 is composed of three Zener diodes ZD1, ZD2, and ZD3, which are electrically connected in series. Similarly, the protection diode circuit 15 is composed of three Zener diodes ZD4, ZD5, and ZD6, which are electrically connected in series.

Concretely, the anode of the Zener diode ZD1 is electrically connected to the secondary winding 6b1, the cathode thereof is electrically connected to the anode of the Zener diode ZD2, and the cathode of the Zener diode ZD2 is electrically connected to the anode of the Zener diode ZD3. The cathode of the Zener diode ZD3 is electrically connected through the smoothing inductor 8 to the positive terminal of the low voltage battery 3.

Similarly, the anode of the Zener diode ZD4 is electrically connected to the secondary winding 6b2, the cathode thereof is electrically connected to the anode of the Zener diode ZD5, and the cathode of the Zener diode ZD5 is electrically connected to the anode of the Zener diode ZD6. The cathode of the Zener diode ZD6 is electrically connected through the smoothing inductor 8 to the positive terminal of the low DC-voltage battery 3.

With the first embodiment, the rectifying circuit 7 is also composed of a pair of surge absorption capacitors 16 and 17, which are electrically connected to the rectifying diodes 71 and 72 in parallel thereto, respectively.

The Zener diodes ZD1, ZD2, and ZD3 are so designed that the sum of their breakdown voltages (Zener voltages) of the diodes ZD1, ZD2, and ZD3 is lower than the breakdown voltage of the rectifying diode 71. Similarly, the Zener diodes ZD4, ZD5, and ZD6 are so designed that the sum of their breakdown voltages of the diodes ZD4, ZD5, and ZD6 is lower than the breakdown voltage of the rectifying diode 72.

Each Zener diode has a voltage regulation characteristic that, when it is reverse-biased, breakdown occurs at its constant breakdown voltage, giving a sharp increase in current.

In addition, the Zener diodes ZD1, ZD2, and ZD3 are so designed that the sum of their forward voltages is higher than the forward voltage of the rectifying diode 71. Similarly, the Zener diodes ZD4, ZD5, and ZD6 are so designed that the sum of their forward voltages is higher than the forward voltage of the rectifying diode 72.

Incidentally, the breakdown voltages of the Zener diodes ZD1, ZD2, and ZD3 may be equal to or different from each other, and those of the Zener diodes ZD4, ZD5, and ZD6 may be equal to or different from each other.

Moreover, when each of the Zener diodes is made of silicon, the forward voltage of each of the Zener diodes is set to approximately 0.7 V.

The DC—DC converter 2 is composed of a controller 20 electrically connected to the gates G1–G4 of the upper and lower MOS transistors 9a, 9b, 10a, and 10b, respectively. The DC—DC converter 2 is also composed of a voltage detecting circuit 21 electrically connected to the positive and negative terminals of the low DC-voltage battery 12 and to the controller 20. The voltage detecting circuit 21 is configured to detect the voltage supplied from the inverter circuit 5, the rectifying circuit 7 and the like to the low DC-voltage battery 3 to send the signal corresponding to the detected voltage value.

In addition, the DC—DC converter 2 includes a voltage monitoring circuit 22 electrically connected to the positive and negative terminals of the high DC-voltage battery 1 and to the controller 20. The voltage monitoring circuit 22 is configured to monitor the DC voltage supplied from the high DC-voltage battery 1 to send the signal corresponding to the detected voltage value.

Incidentally, reference symbols 11 and 12 represent stray inductances, such as leakage inductances of the transformer 6 and wirings, and those cause surge voltages in case of the reverse recoveries of rectifying diodes 71 and 72.

Next, operations of the power supply PS will be explained hereinafter while focusing on operations of the rectifying circuit 7.

The DC voltage of the high DC-voltage battery 1 is smoothed by the smoothing capacitor 4, and the smoothed DC voltage is converted by the inverter circuit 5 into a single-phase AC (alternating current) voltage, that is, a substantially pulse wave AC voltage. The single-phase AC voltage is applied to the primary winding 6a so that AC voltages having 180-degree phase difference between each other corresponding positive and negative cycles of the single-phase AC voltage is induced alternately in the secondary windings 6b1 and 6b2.

The AC voltages are rectifying individually by the rectifying diodes 71 and 72 during the positive and negative cycles (half-wave cycles), respectively. The rectified voltages are smoothed by the smoothing inductor 8 and the smoothing capacitor 13 so that the AC component of each of the rectified voltages is substantially eliminated, whereby DC-voltage is generated.

The DC-voltage is supplied to the low DC-voltage battery 3.

The DC-voltage supplied from the smoothing inductor 8 and the smoothing capacitor 13 is detected by the voltage detecting circuit 21, and the signal corresponding to the detected voltage value is sent to the controller 20.

The controller 20 controls the switching frequencies of the upper and lower arm MOS transistors 9a, 9b, 10a, and 10b to modulate the pulse widths of the pulse wave AC-voltage on the basis of the sent signal, thereby keeping constant the DC-voltage supplied to the battery 3, such as 12V.

On the other hand, in cases where, for example, the rectifying diodes 71 and 72 turn off so that the rectifying diodes 71 and 72 recover in recovery times, high reverse voltages, that is surge voltages, are applied on the rectifying diodes 71 and 72.

Because the sum of the breakdown voltages of the Zener diodes ZD1, ZD2, and ZD3 is lower than the breakdown voltage of the rectifying diode 71, before the applied high reverse voltage exceeds the breakdown voltage of the rectifying diode 71, the applied high reverse voltage allows a current (surge current) to flow in the protection diode circuit 14 (the Zener diodes ZD1, ZD2, and ZD3) in the reverse direction thereof.

Similarly, because the sum of the breakdown voltages of the Zener diodes ZD4, ZD5, and ZD6 is lower than the breakdown voltage of the rectifying diode 72, before the applied high reverse voltage exceeds the breakdown voltage of the rectifying diode 72, the applied high reverse voltage allows a current (surge current) to flow in the protection diode circuit 15 (the Zener diodes ZD4, ZD5, and ZD6) in the reverse direction thereof.

This results in preventing the rectifying diodes 71 and 72 from breaking down in their reverse directions, respectively.

As described above, even if the breakdown voltages of the rectifying diodes 71 and 72 are set to be comparatively low, it is possible to avoid the breakdowns of the rectifying diodes 71 and 72 in their reverse directions. These low breakdown voltages of the rectifying diodes 71 and 72 allow the step-downs of their forward voltages to decrease, making it possible to decrease the heat generation of each of the rectifying diodes 71 and 72 and the loss due to the heat generation thereof.

Moreover, the structure of the rectifying circuit 7 of the first embodiment allows the protection of each of the rectifying diodes 71 and 72 without using a capacitor, a resistor, and a connection therebetween, making it possible to downsize the circuit structure of the rectifying circuit 7.

In addition, because the sum of the forward voltages of the Zener diodes ZD1, ZD2, and ZD3 is higher than the forward voltage of the rectifying diode 71, when the rectifying circuit 7 executes the above normal rectifying operation, no current flows in the Zener diodes ZD1, ZD2, and ZD3. This prevents the Zener diodes ZD1, ZD2, and ZD3 from being heated by the current.

Similarly, because the sum of the forward voltages of the Zener diodes ZD4, ZD5, and ZD6 is higher than the forward voltage of the rectifying diode 72, when the rectifying circuit 7 executes the above normal rectifying operation, no current flows in the Zener diodes ZD4, ZD5, and ZD6. This prevents the Zener diodes ZD4, ZD5, and ZD6 from being heated by the current.

In cases where, therefore, the connections of the positive and negative terminals of the low DC-voltage battery 3 to the output side of the rectifying circuit 2 are reversed by mistake, the forward currents flow in the rectifying diodes 71 and 72 each with high current capacity over a comparatively long time, respectively, and do not the Zener diodes ZD1–ZD3 and ZD4–ZD6.

This allows the current ratings of the protection diode circuits 14 and 15 to be kept low, respectively.

That is, the protection diode circuits 14 and 15 keep their temperatures low, respectively, because no current flow therein, which permit the protection diode circuits 14 and 15 to sufficiently absorb the surge currents, respectively.

In addition, the series connection of the plurality of Zener diodes ZD1–ZD3 of the protection diode circuit 14 allows the apparent junction capacity of the protection diode circuit 14 to decease, making it possible to decrease the reactive power of the protection diode circuit 14. Similarly, the series connection of the plurality of Zener diodes ZD4–ZD6 of the protection diode circuit 15 allows the apparent junction capacity of the protection diode circuit 15 to decrease, making it possible to decrease the reactive power of the protection diode circuit 15.

In this first embodiment, if the DC-voltage supplied from the high DC-voltage battery 1 becomes excessively high due to some reason, the excessively high voltage is monitored by the monitor circuit 22 so that the signal representing the excessively high voltage is sent to the controller 20. The controller 20 controls that the MOS transistors 9a, 9b, 10a, and 10b turn off, respectively, to deactivate the inverter circuit 5.

This structure and function allow the steady-state voltage of each secondary winding of the transformer 6 to be set not to exceed the sum of the breakdown voltages of the Zener diodes ZD1–ZD3 and that of the breakdown voltages of the Zener diodes ZD4–ZD6. This structure prevents the Zener diodes ZD1–ZD3 and ZD4–ZD6 from being constantly conducted, making it possible to restrain the power rating of each of the Zener diodes.

In particular, in the first embodiment, each of the Zener diodes keeps its temperature low during the constant rectifying operation of the rectifying circuit 7 because no current constantly flows in each of the Zener diodes, so that the allowable temperature rise of each of the Zener diodes is large, in other words, the heat capacity thereof is large.

If, therefore, the DC-voltage supplied from the high DC-voltage battery 1 becomes excessively high, and these Zener diodes ZD1–ZD3 and ZD4–ZD6 are instantaneously conducted, it is possible to prevent their temperatures of the Zener diodes from being excessively high.

(Second Embodiment)

Figure 2:
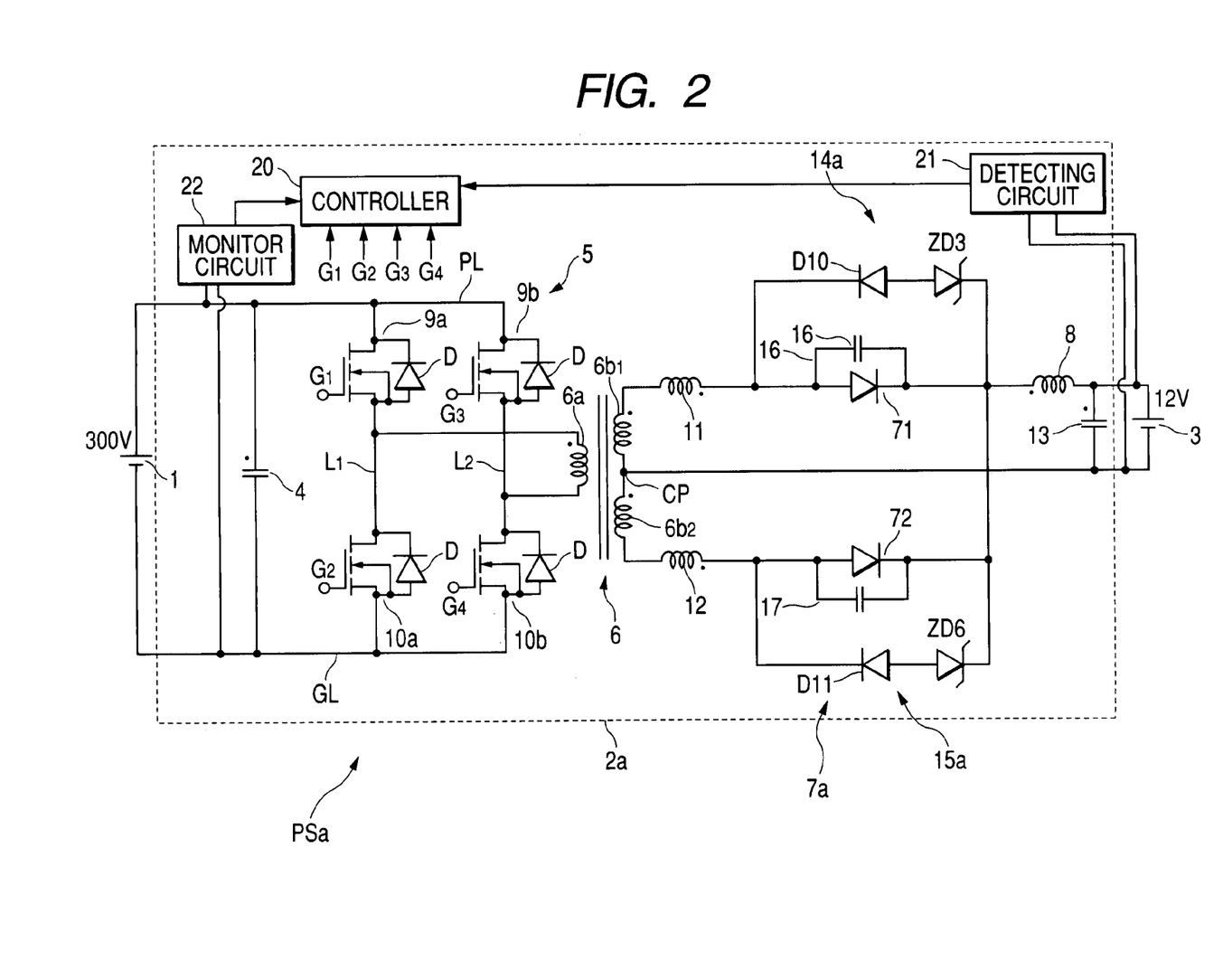
FIG. 2 is a circuit diagram illustrating a circuit structure of a power supply for vehicles, in which a DC—DC converter including a rectifying circuit according to a second embodiment of the present invention.

FIG. 2 is a circuit diagram illustrating a circuit structure of a power supply PSa for vehicles, in which a DC—DC converter including a rectifying circuit according to a second embodiment of the present invention.

Incidentally, elements of the DC—DC converter according to the third embodiment, which are substantially identical with those of the power supply PS according to the first embodiment, are assigned to the same reference characteristics of the power supply PS shown in FIG. 1, and explanations thereabout are omitted or simplified. That is, specific points of the power supply PSa according to the second embodiment different from the power supply PS according to the first embodiment are focused.

As shown in FIG. 2, the power supply PSa includes a DC—DC converter 2a, and the DC—DC converter 2a is composed of a rectifying circuit 7a.

The rectifying circuit 7a, in place of the protection diode circuits 14 and 15, is composed of protection diode circuit 14a and 15a.

The protection diode circuit 14a is composed of a junction diode D10, in place of the Zener diodes ZD1 and ZD2, and the Zener diode ZD3, and those are electrically connected in series. The protection diode circuit 15a is composed of a junction diode D11, in place of the Zener diodes ZD4 and ZD5, and the Zener diode ZD6, which are electrically connected in series.

The junction diodes D10 and D11 are reversely connected to the Zener diodes ZD3 and ZD6, respectively. That is, the cathode of the junction diode D10 is electrically connected to the secondary winding 6b1, and the anode thereof is electrically connected to the anode of the Zener diode ZD3. Similarly, the cathode of the junction diode D11 is electrically connected to the secondary winding 6b2, and the anode thereof is electrically connected to the anode of the Zener diode ZD6.

Incidentally, as the junction diode D10, a plurality of junction diodes connected in series may be used, and as the junction diode D11, a plurality of junction diodes connected in series may be used.

Each junction diode has a voltage regulation characteristic that, when it is reverse biased, breakdown occurs at its regular breakdown voltage, giving a sharp increase in current.

The junction diode D10 and the Zener diode ZD3 are so designed that the sum of the forward voltage of the diode D10 and the breakdown voltage of the Zener diode ZD3 is lower than the breakdown voltage of the rectifying diode 71. Similarly, the junction diode D11 and the Zener diode ZD6 are so designed that the sum of the forward diode D11 and the breakdown voltage of the Zener diode ZD6 is lower than the breakdown voltage of the rectifying diode 72.

In addition, the junction diode D10 and the Zener diode ZD3 are so designed that the sum of the breakdown voltage of the junction diode D10 and the forward voltage of the Zener diode ZD3 is higher than the forward voltage of the rectifying diode 71. Similarly, the junction diode D11 and the Zener diode ZD6 are so designed that the sum of the breakdown voltage of the junction diode D11 and the forward voltage of the Zener diode ZD6 is higher than the forward voltage of the rectifying diode 72.

This structure of the second embodiment can obtain substantially the same effects of the first embodiment.

Specifically, because the sum of the forward voltage of the diode D10 and the breakdown voltage of the Zener diode ZD3 is lower than the breakdown voltage of the rectifying diode 71, and that of the forward voltage of the diode D11 and the breakdown voltage of the Zener diode ZD6 is lower than the breakdown voltage of the rectifying diode 72, it is possible to prevent the rectifying diodes 71 and 72 from breaking down in their reverse directions, respectively.

In addition, the sum of the breakdown voltage of the junction diode D10 and the forward voltage of the Zener diode ZD3 is higher than the forward voltage of the rectifying diode 71, and that of the breakdown voltage of the junction diode D11 and the forward voltage of the Zener diode ZD6 is higher than the forward voltage of the rectifying diode 72. This keeps current from flowing in the diodes D10, ZD3, D11 and ZD6, making it possible to prevent each of the diodes D10, ZD3, D11 and ZD6 from being heated by the current.

As a specific effect of the second embodiment, in cases where the connections of the positive and negative terminals of the low DC-voltage battery 3 to the output side of the rectifying circuit 2 are reversed by mistake, the forward currents with respect to the protection diode circuits 14a and 15a are blocked by the junction diodes D10 and D11, respectively, allowing the current ratings of the protection diode circuits 14 and 15 to be kept low, respectively.

(Third Embodiment)

Figure 3:
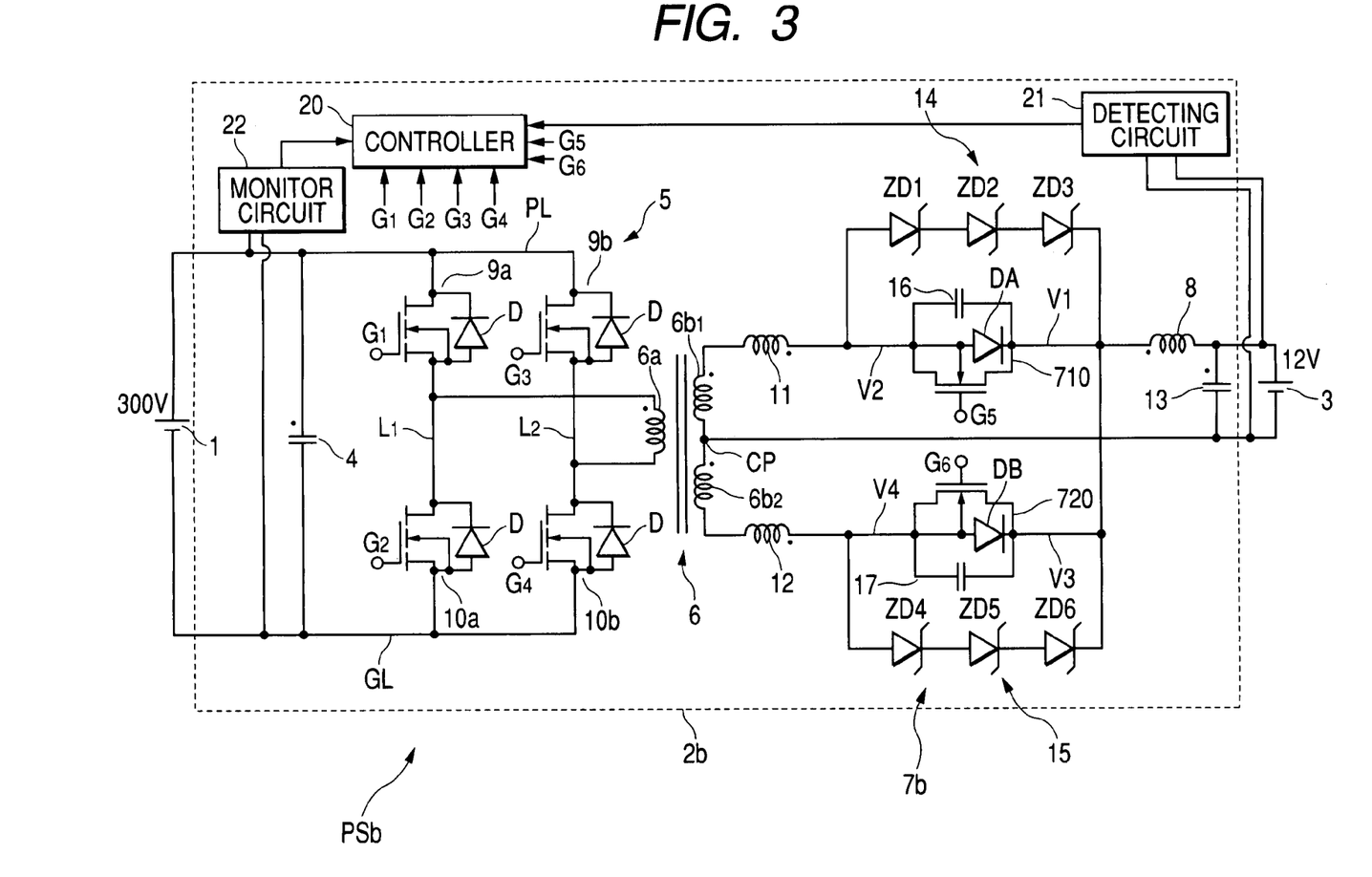
FIG. 3 is a circuit diagram illustrating a circuit structure of a power supply for vehicles, in which a DC—DC converter including a rectifying circuit according to a third embodiment of the present invention.

FIG. 3 is a circuit diagram illustrating a circuit structure of a power supply PSb for vehicles, in which a DC—DC converter including a rectifying circuit according to a third embodiment of the present invention.

Incidentally, elements of the DC—DC converter according to the third embodiment, which are substantiality identical with those of the power supply PS according to the first embodiment, are assigned to the same reference characteristics of the power supply PS shown in FIG. 1, and explanations thereabout are omitted or simplified. That is, specific points of the power supply PSb according to the third embodiment different from the power supply PS according to the first embodiment are focused.

As shown in FIG. 3, the power supply PSb includes a DC—DC converter 2b, and the DC—DC converter 2b is composed of a rectifying circuit 7b.

The rectifying circuit 7b, in place of the rectifying diodes 71 and 72, is composed of synchronous rectifying MOS transistors 710 and 720.

That is, the source of the MOS transistor 710 is electrically connected to the secondary winding 6b1, and the drain of the MOS transistor 710 is electrically connected through the smoothing inductor 8 to the positive terminal of the low DC-voltage battery 3. Reference character DA represents a intrinsic diode connected between the source and the drain of the MOS transistor 710.

Similarly, the source of the MOS transistor 720 is electrically connected to the secondary winding 6b2, and the drain of the MOS transistor 720 is electrically connected through the smoothing inductor 8 to the positive terminal of the low DC-voltage battery 3. Reference character DB represents a intrinsic diode connected between the source and the drain of the MOS transistor 720.

As well as the rectifying circuit 7 according to the first embodiment, the protection diode circuit 14 composed of series connected Zener diodes ZD1–ZD3 is electrically connected to the MOS transistor 710 in parallel thereto, and the protection diode circuit 15 composed of series connected Zener diodes ZD4–ZD6 is electrically connected to the MOS transistor 720 in parallel thereto. The surge absorption capacitors 16 and 17 are electrically connected to the MOS transistors 710 and 720 in parallel thereto, respectively.

In addition, the sum of the breakdown voltages of the Zener diodes ZD1, ZD2, and ZD3, that is, the breakdown voltages (Zener voltages) thereof is lower than the breakdown voltage of the MOS transistor 710. Similarly, the sum of the breakdown voltages of the Zener diodes ZD4, ZD5, and ZD6, that is, the breakdown voltages (Zener voltages) thereof is lower than the breakdown voltage of the MOS transistor 720.

Moreover, the sum of the forward voltages of the Zener diodes ZD1, ZD2, and ZD3 is higher than the forward voltage of the intrinsic diode DA of the MOS transistor 710. Similarly, the sum of the forward voltages of the Zener diodes ZD4, ZD5, and ZD6 is higher than the forward voltage of the intrinsic diode DB.

The gates G5 and G6 of the MOS transistors 710 and 720 are electrically connected to the controller 20.

In the third embodiment, the controller 20 controls the MOS transistor 710 so that, for example, while the AC voltage V2 applied to the MOS transistor 710 is positively larger than the voltage V1 at the line connected between the drain of the MOS transistor 710 and the smoothing inductor 8, the MOS transistor 710 turns on. Similarly, the controller 20 controls the MOS transistor 720 so that, for example, while the AC voltage V4 applied to the MOS transistor 720 is positively larger than the voltage V2 at the line connected between the drain of the MOS transistor 720 and the smoothing inductor 8, the MOS transistor 720 turns on.

As a result, the AC voltages are synchronously rectified individually by the MOS transistors 710 and 720, respectively.

When the MOS transistors 710 and 720 turn off respectively, the magnetic energy of the smoothing inductor 8 causes the rectified current to flow in each of the intrinsic diodes DA and DB.

This structure of the third embodiment can obtain substantially the same effects of the first embodiment.

Specifically, the sum of the breakdown voltages of the Zener diodes ZD1–ZD3 is lower than the breakdown voltage of the MOS transistor 710, and that of the breakdown voltages of the Zener diodes ZD4–ZD6 is lower than the breakdown voltage of the MOS transistor 720. Therefore, in cases where, for example, the intrinsic diodes DA and Db turn off so that the intrinsic diodes DA and Db recover in recovery times, high reverse voltages, that is surge voltages, are applied on the MOS transistors 710 and 720, before the applied high reverse voltages exceed the breakdown voltages of the MOS transistors 710 and 720, the applied high reverse voltages allow currents (surge currents) to flow in the protection diode circuits 14 (Zener diodes ZD1–ZD3) and 15 (Zener diodes ZD4–ZD6) in their reverse directions, respectively.

Consequently, it is possible to decrease the breakdown voltages of the MOS transistors 710 and 720, respectively.

Similarly, to the first embodiment, it is possible to decease the on resistance of each of the MOS transistors 710 and 720, thereby reducing the heat generation of each of the MOS transistors 710 and 720 and the loss due to the heat generation thereof.

In addition, because the sum of the forward voltages of the Zener diodes ZD1, ZD2, and ZD3 is higher than the forward voltage of the intrinsic diode DA of the MOS transistor 710, when the rectifying circuit 7b executes the above normal rectifying operation, no current flows in the Zener diodes ZD1, ZD2, and ZD3. This prevents the Zener diodes ZD1, ZD2, and ZD3 from being heated by the current.

Similarly, because the sum of the forward voltages of the Zener diodes ZD4, ZD5, and ZD6 is higher than the forward voltage of the intrinsic diode DB of the MOS transistor 720, when the rectifying circuit 7b executes the above normal rectifying operation, no current flows in the Zener diodes ZD4, ZD5, and ZD6. This prevents the Zener diodes ZD4, ZD5, and ZD6 from being heated by the current.

In cases where, therefore, the connections of the positive and negative terminals of the low DC-voltage battery 3 to the output side of the rectifying circuit 2 are reversed by mistake, the forward currents flow in the intrinsic diodes DA and DB of the MOS transistors 710 and 720 each with high current capacity over a comparatively long time, respectively, and do not the Zener diodes ZD1–ZD3 and ZD4–ZD6.

This allows the current ratings of the protection diode circuits 14 and 15 to be kept low, respectively.

Namely, the protection diode circuits 14 and 15 keep their temperatures low, respectively, because no current flow therein, which permit the protection diode circuits 14 and 15 to sufficiently absorb the surge currents, respectively.

(Fourth Embodiment)

Figure 4:
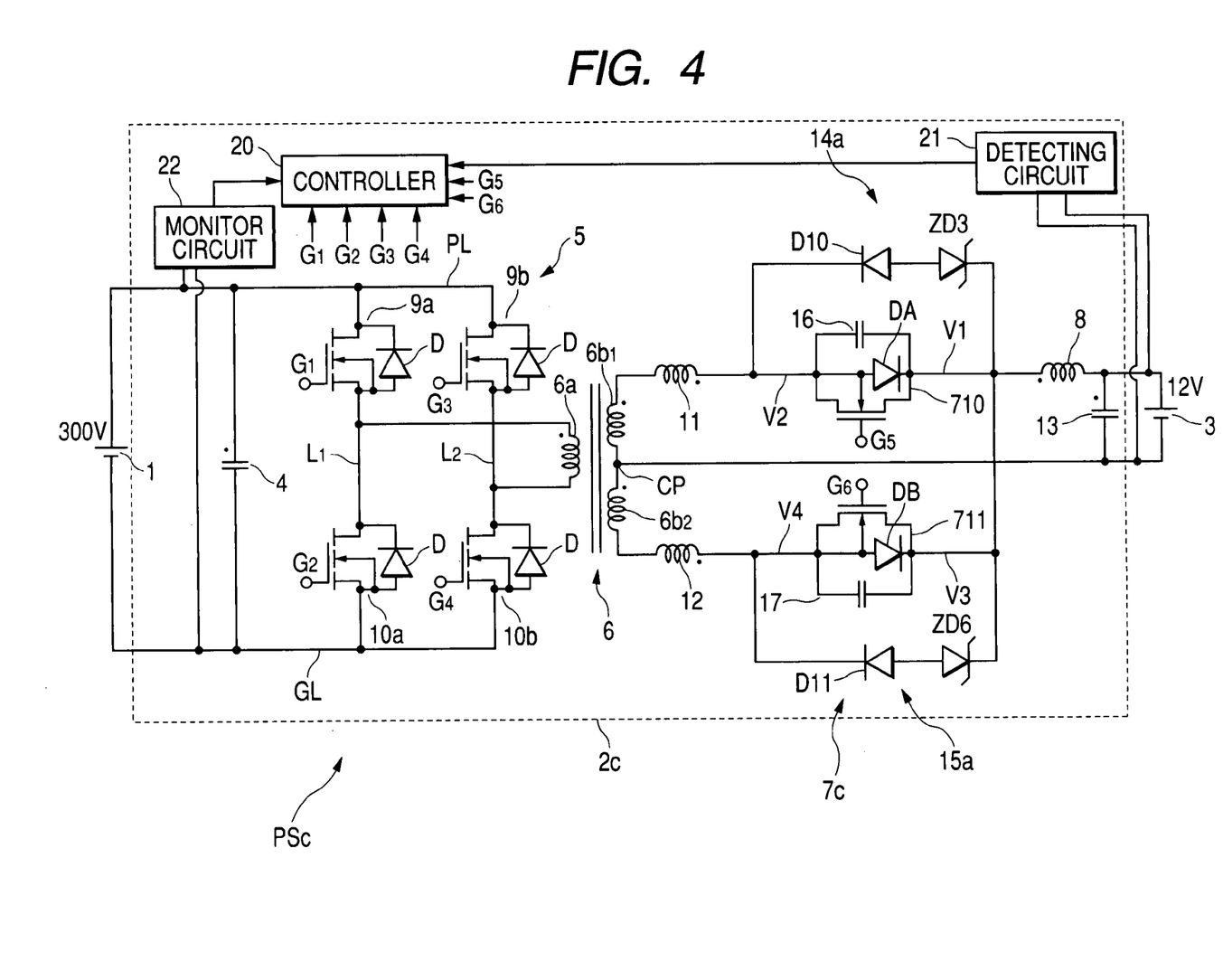
FIG. 4 is a circuit diagram illustrating a circuit structure of a power supply for vehicles, in which a DC—DC converter including a rectifying circuit according to a fourth embodiment of the present invention.

FIG. 4 is a circuit diagram illustrating a circuit structure of a power supply PSc for vehicles, in which a DC—DC converter including a rectifying circuit according to a fourth embodiment of the present invention.

Incidentally, elements of the DC—DC converter according to the fourth embodiment, which are substantially identical with those of the power supplies PSa and PSb according to the second and third embodiments, are assigned to the same reference characteristics of the power supplies PSa and PSb shown in FIGS. 2 and 3, and explanations thereabout are omitted or simplified. That is, specific points of the power supply PSc according to the fourth embodiment different from the power supply PS according to the first embodiment are focused.

As shown in FIG. 4, the power supply PSc includes a DC—DC converter 2c, and the DC—DC converter 2c is composed of a rectifying circuit 7c.

The rectifying circuit 7c, in place of the rectifying diodes 71 and 72 shown in FIG. 2, is composed of synchronous rectifying MOS transistors 710 and 720.

The rectifying circuits 7a and 7b have the same structures shown in FIG. 2, respectively.

That is, the sum of the forward voltage of the junction diode D10 and the breakdown voltage of the Zener diode ZD3 is lower than the breakdown voltage of the MOS transistor 710. Similarly, the sum of the forward voltage of the junction diode D11 and the breakdown voltage of the Zener diode ZD6 is lower than the breakdown voltage of the MOS transistor 720.

Moreover, the sum of the breakdown voltage of the diode D10 and the forward voltage of the diode ZD3 is higher than the forward voltage of the intrinsic diode DA of the MOS transistor 710. Similarly, the sum of the breakdown voltage of the diode D11 and the forward voltage of the diode ZD6 is higher than the forward voltage of the intrinsic diode DB.

In the fourth embodiment, the controller 20 controls the MOS transistor 710 so that, for example, while the AC voltage V2 applied to the MOS transistor 710 is positively larger than the voltage V1 at the line connected between the drain of the MOS transistor 710 and the smoothing inductor 8, the MOS transistor 710 turns on. Similarly, the controller 20 controls the MOS transistor 720 so that, for example, while the AC voltage V4 applied to the MOS transistor 720 is positively larger than the voltage V2 at the line connected between the drain of the MOS transistor 720 and the smoothing inductor 8, the MOS transistor 720 turns on.

As a result, the AC voltages are synchronously rectified individually by the MOS transistors 710 and 720, respectively.

When the MOS transistors 710 and 720 turn off respectively, the magnetic energy of the smoothing inductor 8 causes the rectified current to flow in each of the intrinsic diodes DA and DB.

This structure of the fourth embodiment can obtain substantially the same effects of the second and third embodiments.

In a modification of each of the first to fourth embodiments, a capacitor may be added to be connected to the Zener diodes, the junction diodes, or the MOS transistors of the corresponding rectifying circuit in parallel thereto.

In another modification of each of the first to fourth embodiments, the rectifying diodes or the MOS transistors may be integrated with the protection diode circuits in a common module component, such as common chip.

Figure 5:
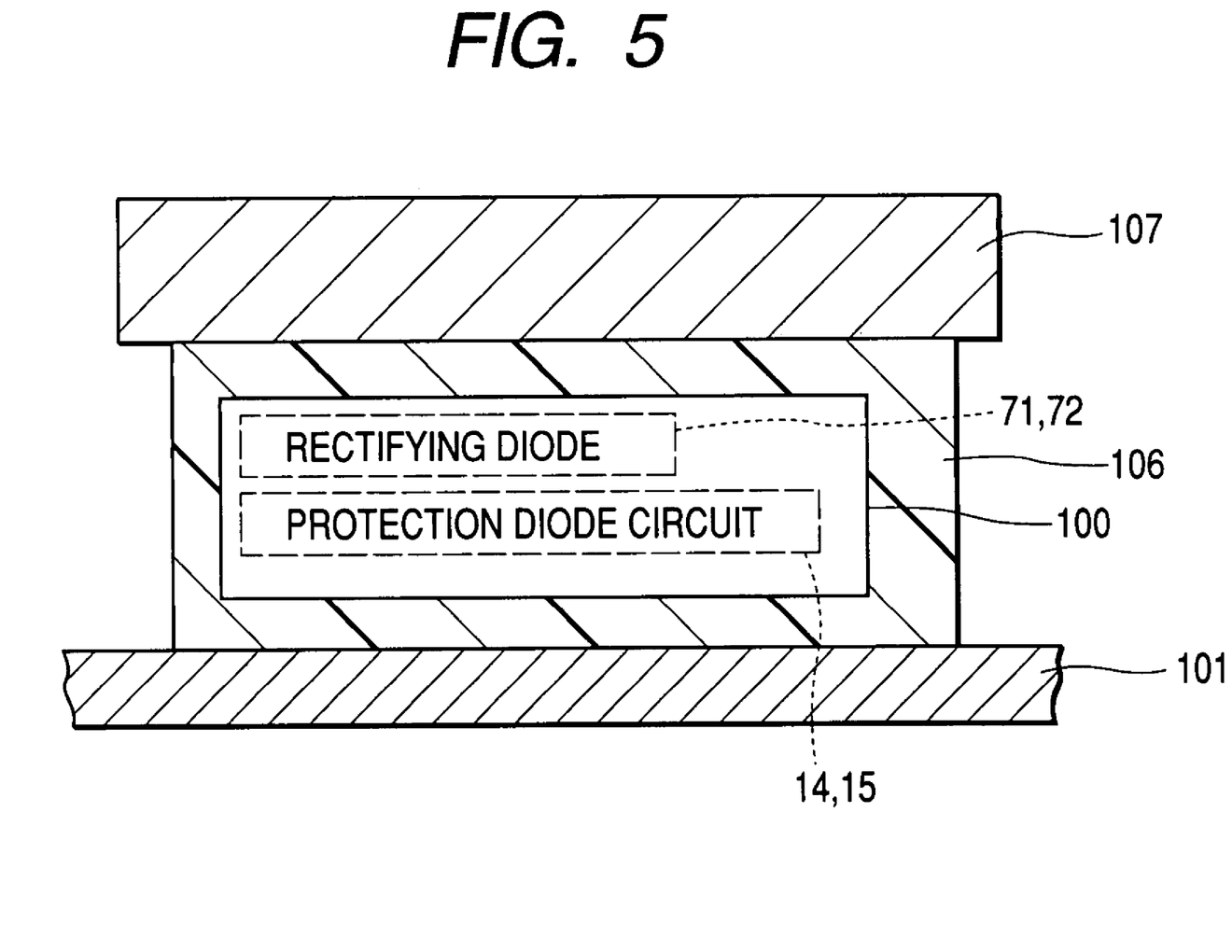
FIG. 5 is a cross sectional view illustrating a single semiconductor chip in which, for example, rectifying diodes and the protection diode circuits are integrated, respectively.

FIG. 5 is a cross sectional view illustrating a common semiconductor module or chip in which, for example, the rectifying diodes 71 and 72, and the protection diode circuits 14 and 15 are integrated, respectively.

The semiconductor chip 100 is mounted on a printed-circuit board 101. The semiconductor chip 100 is composed of a chip body 102 in which the rectifying diodes 71 and 72, and the protection diode circuits 14 and 15 are integrated, respectively. The chip body 100 is covered with a package 106 made of resin. At least one surface of the package 106 is contacted to a metal heat sink plate 107 which is served as a cooling unit for cooling through the package 106 the semiconductor chip 100.

In this another modification, the heat sink plate 107 is used for cooing all of the rectifying diodes 71 and 72, and the protection diode circuits 14 and 15 in the chip body 100, making it possible to omit a heat sink plate of the protection diode circuits 14 and 15.

In the first to fourth embodiments and modifications, the protection diode circuits according to the present invention, which are applied to the rectifying circuits, each of which executes the single phase full-wave rectification of the AC voltage outputted from the paired secondary windings, are explained, but the present invention is not limited to the applications.

For example, the protection diode circuits according to the present invention may be connected to rectifying diodes or MOS transistors of rectifying circuits in parallel thereto, respectively, each of which rectifies the AC voltage outputted from a motor-generator, such as a three phase generator which is generating electricity.

In the first to fourth embodiments and modifications, as the constant reverse voltage diodes, the Zener diodes or the like is used. However, constant reverse voltage diodes each of which has a voltage regulation characteristic that, when it is reverse-biased, breakdown occurs at its breakdown voltage, giving a sharp increase in current, such as avalanche diodes. Concretely, in the Zener diode, the breakdown occurs at its break down voltage of, for example 5.1 V or less, and in the avalanche diode, the breakdown occurs at its break down voltage of, for example 5.1 V or over.

While there has been described what is at present considered to be the embodiments and modifications of the invention, it will be understood that various modifications which are not described yet may be made therein, and it is intended to cover in the appended claims all such modifications as fall within the true spirit and scope of the invention.

This application is based upon and claims the benefit of priority of the prior Japanese Patent Application 2003-061564 filed on Mar. 7, 2003 so that the contents of which are incorporated herein by reference.

What is claimed is:

1. A rectifying circuit comprising:
a rectifying diode having a breakdown voltage and a first forward voltage, and configured to rectify a first AC voltage to output a first DC voltage; and
a protection diode circuit having a plurality of constant reverse voltage diodes and electrically connected to the rectifying diode in parallel thereto, said plurality of constant reverse voltage diodes being electrically connected to each other in series, each of said plurality of constant reverse voltage diodes having a breakdown voltage and a second forward voltage,
wherein a sum of said breakdown voltages of the plurality of constant reverse voltage diodes is lower than the breakdown voltage of the rectifying diode, and a sum of said second forward voltages of the constant reverse voltage diodes is higher than the first forward voltage of the rectifying diode.

2. A rectifying circuit according to claim 1, wherein said plurality of constant reverse voltage diodes are plurality of Zener diodes.

3. A rectifying circuit according to claim 1, wherein said plurality of constant reverse voltage diodes and the rectifying diode are integrated with each other in a common module or common chip.

4. A rectifying circuit according to claim 1, wherein said first AC voltage is a voltage that is induced in a secondary winding of a transformer of a DC—DC converter, said secondary winding being electrically connected to the rectifying diode.

5. A rectifying circuit according to claim 4, wherein said DC—DC converter is configured to supply the first DC voltage which is lower than a second DC voltage, to convert the second DC voltage into a second AC voltage, and to supply the second AC voltage to a primary winding of the transformer, so that the first AC voltage is induced in the secondary winding of the transformer.

6. A rectifying circuit according to claim 1, wherein said plurality of constant reverse voltage diodes are plurality of avalanche diodes.

7. A rectifying circuit comprising:
- a rectifying diode having a breakdown voltage and a first forward voltage, said rectifying diode being configured to rectify an AC voltage; and
- a protection diode circuit having a protection diode and a constant reverse voltage diode and electrically connected in parallel to the rectifying diode, said protection diode having a breakdown voltage and a second forward voltage and being reversely connected to the rectifying diode, said constant reverse voltage diode having a breakdown voltage and a third forward voltage and electrically connected reversely to the protection diode in series,
- wherein a sum of said second forward voltage of the protection diode and the breakdown voltage of the constant reverse voltage diode is lower than the breakdown voltage of the rectifying diode, and a sum of said breakdown voltage of the protection diode and the third forward voltage of the constant reverse voltage diode is higher than the first forward voltage of the rectifying diode.

8. A rectifying circuit according to claim 7, wherein said constant reverse voltage diode is a Zener diode.

9. A rectifying circuit according to claim 7, wherein said constant reverse voltage diode, protection diode, and rectifying diode are integrated with each other in a common module or common chip.

10. A rectifying circuit according to claim 7, wherein said first AC voltage is a voltage that is induced in a secondary winding of a transformer of a DC—DC converter, said second winding being electrically connected to the rectifying diode.

11. A rectifying circuit according to claim 10, wherein said DC—DC converter is configured to supply the first DC voltage which is lower than a second DC voltage, to convert the second DC voltage into a second AC voltage, and to supply the second AC voltage to a primary winding of the transformer, so that the first AC voltage is induced in the secondary winding of the transformer.

12. A rectifying circuit according to claim 7, wherein sad constant reverse voltage diode is an avalanche diode.

13. A rectifying circuit comprising:
- a synchronous rectifying MOS transistor having a breakdown voltage and an intrinsic diode with a first forward voltage, said synchronous rectifying MOS transistor being configured to synchronously rectify an AC voltage; and
- a protection diode circuit having a plurality of constant reverse voltage diodes and electrically connected to the synchronous rectifying MOS transistor in parallel thereto, said plurality of constant reverse voltage diodes being electrically connected to each other in series, each of said plurality of constant reverse voltage diodes having a breakdown voltage and a second forward voltage,
- wherein a sum of said breakdown voltages of the plurality of constant reverse voltage diodes is lower than the breakdown voltage of the synchronous rectifying MOS transistor, and a sum of said second forward voltages is higher than the first forward voltage of the intrinsic diode of the synchronous rectifying MOS transistor.

14. A rectifying circuit according to claim 13, wherein said plurality of constant reverse voltage diodes are the plurality of Zener diodes.

15. A rectifying circuit according to claim 13, wherein said plurality of constant reverse voltage diodes and the rectifying MOS transistor are integrated with each other in a common module or common chip.

16. A rectifying circuit according to claim 13, wherein said first AC voltage is a voltage that is induced in a secondary winding of a transformer of a DC—DC converter, said secondary winding being electrically connected to the synchronous rectifying MOS transistor.

17. A rectifying circuit according to claim 16, wherein said DC—DC converter is configured to supply the first DC voltage which is lower than a second DC voltage, to convert the second DC voltage into a second AC voltage, and to supply the second AC voltage to a primary winding of the transformer, so that the first AC voltage is induced in the secondary winding of the transformer.

18. A rectifying circuit according to claim 13, wherein said plurality of constant reverse voltage diodes are plurality of avalanche diodes.

19. A rectifying circuit comprising:
- a synchronous rectifying MOS transistor having a breakdown voltage and an intrinsic diode with a first forward voltage, said synchronous rectifying MOS transistor being configured to synchronously rectify an AC voltage; and
- a protection diode circuit having a protection diode and a constant reverse voltage diode and electrically connected in parallel to the synchronous rectifying MOS transistor, said protection diode having a breakdown voltage and a second forward voltage and being reversely connected with respect to the intrinsic diode of the synchronous rectifying MOS transistor, said constant reverse voltage diode having a breakdown voltage and a third forward voltage, and electrically connected reversely to the protection diode in series,
- wherein a sum of said second forward voltage of the protection diode and the breakdown voltage of the constant reverse voltage diode is lower than the breakdown voltage of the synchronous rectifying MOS transistor, and a sum of said breakdown voltage of the protection diode and said third forward voltage of the constant reverse voltage diode is higher than the first forward voltage of the intrinsic diode.

20. A rectifying circuit according to claim 19, wherein said constant reverse voltage diode is a Zener diode.

21. A rectifying circuit according to claim 19, wherein said constant reverse voltage diode and the MOS transistor are integrated with each other in a common module or common chip.

22. A rectifying circuit according to claim 19, wherein said first AC voltage is a voltage that is induced in a secondary winding of a transformer of a DC—DC converter, said secondary winding being electrically connected to the MOS transistor.

23. A rectifying circuit according to claim 22, wherein said DC—DC converter is configured to supply the first DC voltage which is lower than a second DC voltage, to convert the second DC voltage into a second AC voltage, and to supply the second AC voltage to a primary winding of the transformer, so that the first AC voltage is induced in the secondary winding of the transformer.

24. A rectifying circuit according to claim 19, wherein said constant reverse voltage diode is an avalanche diode.

* * * * *